Patented May 29, 1951

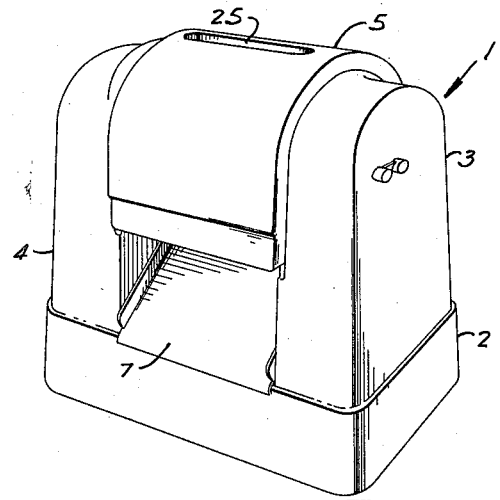
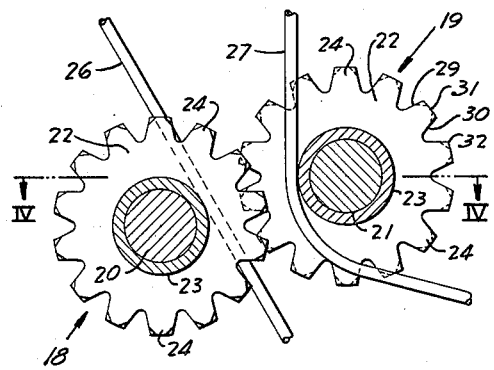
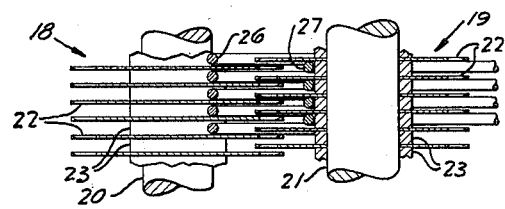
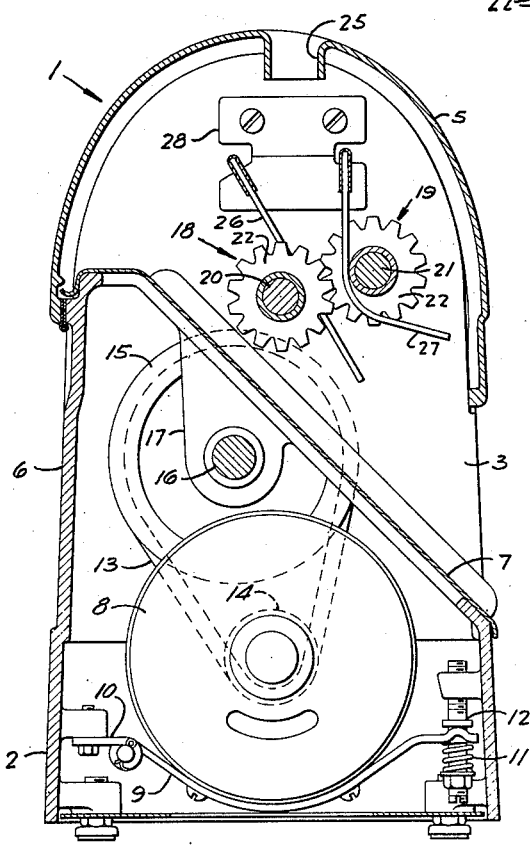

2,554,863

UNITED STATES PATENT OFFICE 2,554,863

CUTTER FOR MEAT TENDERIZING MACHINES

Arthur E. Lindner and Bruce E. Robinson, Toledo, Ohio, assignors to Toledo Scale Company, Toledo, Ohio, a corporation of New Jersey Application June 12, 1945, Serial No. 599,056

1 Claim. (Cl. 17—26)

This invention relates to meat tenderizing machines and in particular to an improved form of knife or cutter for use in the knife roll of a meat tenderizer.

Some cuts of meat have tough sinews running through them which make these cuts of meat undesirable for table use. These cuts of meat may be made more palatable by scoring the meat with a sharp knife or by pounding it with a steak hammer or similar instrument. Machines for performing the scoring operation have been constructed in various forms. In a preferred form, slices of meat to be tenderized are passed between motor driven rolls comprising a large number of cutter blades each of which is a toothed disk, whose teeth are sharpened along the periphery of the disk so that they may cut the meat sinews as the meat is passed between the rolls.

One disadvantage of having the teeth sharpened on the peripheral edges is the danger that the operator may cut himself on these teeth when he removes the cutter rolls from the machine for cleaning purposes.

The object of this invention is to provide a novel form of cutter tooth adapted for satisfactorily severing the sinews of meat being passed through the tenderizing machine but which, by presenting a substantial dull peripheral area, promotes the knitting action of the rolls on the meat and materially reduces the danger involved in handling the cutter rolls.

Another object is to provide a cutter tooth having dull sides and top and beveled corners, the bevel being from one side of the cutter blade so as to produce a sharpened edge at the corners of the tooth.

Another object is to provide an economical method of producing the improved cutter blade.

These and other objects and advantages are apparent from the following description in which reference is made to the accompanying drawings illustrating a preferred embodiment of the invention.

In the drawings:

Figure I is a perspective view of a meat tenderizing machine employing the improved form of cutter blades.

Figure II is an enlarged vertical transverse section of the meat tenderizing machine.

Figure III is an enlarged fragmentary detail showing the engagement of the cutter blades.

Figure IV is a fragmentary plan view, partly in section, taken substantially along the line IV—IV of Figure III.

Figure V is an enlarged fragmentary view of one of the the teeth of a cutter blade.

Figure VI is a fragmentary sectional view illustrating one method of forming the improved cutter tooth.

Figure VII is a fragmentary view of another method of forming the improved cutter teeth.

These specific figures and the accompanying description are intended to illustrate the invention but not to impose limitations on the claim.

According to the invention the individual cutter teeth of the cutter blades are formed with beveled corners so as to present sharp corners in an otherwise dull periphery. The sides of the individual teeth between the corners and the root of the tooth are also dull. When such a tooth form is employed in a tenderizing machine the rate of passage of the meat through the rolls is determined largely by the dull side edges of the teeth. The sharp corners of the teeth engage the meat as it is being fed into the space between the cutting rolls and cut their way part way through the meat and out again. Because the sharp cutting corners of the teeth are at a greater radius than the dull side edges the sharp corners travel faster than the meat so that the dull peripheral portion of a tooth tends to slide along through a cut rather than to punch its way into the meat. Thus the efficiency of the cutter blades is not materially reduced by leaving a dull peripheral portion which permits the assembled cutter rolls to be safely handled.

The dull peripheral edges of the teeth promote the knitting action of the rolls when two or more pieces of meat are passed through simultaneously. Whereas a tooth having a sharp periphery tends to cut its way through the first slice of meat and into a second slice, the sharp-cornered dull-periphery tooth forces some of the meat fibers of the first slice deeply into the second slice. This action allows two or more slices or cuts of similar or dissimilar meat products to be sandwiched together into a composite cut capable of maintaining its form during handling and cooking.

In this way small pieces of meat which ordinarily would go into hamburger may be worked together into salable cuts and sold at a better profit.

A meat tenderizing machine in which the improved form of cutter may be used is built into a housing 1 which comprises a base portion 2 from which end columns 3 and 4 are erected. The columns 3 and 4 are of hollow, rectangular form and terminate in semi-cylindrical tops, the axis of the semi-cylindrical top portions being parallel to the length of the machine. A semi-cylindrical cover 5 hinged to the top of a wall 6 extending between the columns 3 and 4 covers the space between the columns. A removable tray 7 positioned between the columns 3 and 4 extends from the top of the rear wall 6 downwardly and forwardly to the front of the machine. An electric motor 8 is supported in the space beneath the tray 7 on a mounting strap 9, one end of which is hinged to a bracket 10 attached to one inside wall of the base 2. The other end of the mounting strap 9 is carried on a spring 11 circumjacently mounted on an adjusting screw 12. The spring 11 is designed to support the excess of the weight of the motor 8 over that required to maintain suitable tension in a V-belt 13 connecting a pulley 14 on the motor shaft to a larger pulley 15 carried on a countershaft 16. The countershaft 16, which is journaled in brackets 17, is connected through gearing (not shown) located in the end tower 4 and adapted to drive cutter rolls 18 and 19 extending between the columns 3 and 4. The cutter rolls 18 and 19 include shafts 20 and 21 on each of which a plurality of cutter disks 22 are mounted and separated by spacing washers 23.

The cutter disks 22 are formed with teeth 24 evenly spaced around their peripheries. The center to center spacing of the shafts 20 and 21 and the size of the cutter disks 22 and their teeth 24 is adjusted so that when the cutter rolls are assembled into the machine the cutter disks intermesh slightly more than the depth of the teeth.

Meat to be tenderized is dropped through a slot 25 in the top of the semi-cylindrical cover 5. After passing through the slot 25 the meat is guided into the space between the cutter rolls by a pair of combs 26 and 27 which are carried on brackets 28 secured to the walls of the columns 3 and 4. The teeth of the combs 26 and 27, which are formed of round wire slightly smaller in diameter than the thickness of the spacing washers 23, extend through the spaces between the cutter disks 22 into the space below the cutter rolls 18 and 19. The teeth of the rear comb 26 are straight and are arranged to lie tangent to the surface of the spacers 23 on the shaft 20 and thus incline downwardly and forwardly at an angle such that they become tangent to the spacing washers 23 on the shaft 20 before they cross the line of centers of the shafts 20 and 21. The teeth of the front comb 27 are formed so that when the comb is in position they extend vertically downwardly until they become tangent to the spacers on the shaft 21, then they curve forwardly in a smooth curve and emerge from the space between the cutter disks 22 in a generally horizontal direction at a point slightly forward from the vertical plane through the shaft 21.

This arrangement of combs causes the meat being tenderized to be guided into the space between the cutter rolls, to be left impaled on the forward cutter roll 19 as it is stripped from the cutter roll 18 by the action of the rear comb 26 and to be carried forward on the under side of the cutter roll 19 free from contact with the rear comb 26 until it is finally stripped from the cutter roll 19 by the combined action of gravity and the teeth of the front comb 27. As it leaves the cutter roll 19 the meat is projected forwardly and if it is not caught by hand tends to strike the tray 7 very near its forward edge.

If the edges 29 and 30 forming the sides of the teeth 24 are sharpened they tend to slash through the meat and instead of nicely tenderizing it they tend to cut it into ribbons. On the other hand, if the peripheral edges 31 of the teeth are sharpened and the edges 29 and 30 are left dull satisfactory tenderizing action occurs because the meat is drawn forward by the dull edges 29 and is cut by the slicing action of the sharp peripheral edge 31. However, a roll constructed of knives having sharp peripheral edges is very dangerous to handle. The fact that meat is drawn through the rolls by the dull edges 29 and 30 of the cutter teeth and that the tips of the teeth, being at a greater radius, are moving faster than the driving edges of the teeth the leading corners 32 do most of the cutting. This makes it possible to get satisfactory tenderizing action by merely sharpening the corners of the teeth leaving the top and sides relatively dull.

Figure V shows one of the teeth 24 of the cutter disk 22 having the improved shape. The edges 29 and 30 of the tooth 24 are flat for the full thickness of the cutter blade. Likewise, the peripheral portion 31 has a flat surface 33 of substantial area. Each corner of the tooth is beveled to give surfaces 34 which, intersecting the other side of the cutter disk, form sharp cutting edges 35 at the corners 32.

The beveled corners 32 may be produced by grinding away one side of each corner of the tooth 24 to form the beveled surfaces 34. This method is slow because at most only two corners may be ground at one time.

A more economical method of forming the beveled corners is to bend the corners in a press so that the upper surface of the bent portion forms the beveled surface 34. The bending operation can be performed as a separate stamping operation or the blanking die used to stamp out the disks may be suitably modified so as to both cut and bend the teeth to the shape shown in Figure VI. After the disks have been hardened they are surface ground from the back side to remove those portions 36 which extend out of the plane of the cutter.

Both of these methods are relatively slow and expensive in that they employ a grinding operation. Entirely satisfactory beveled teeth may also be produced by a pressing or coining operation. In practicing this method the teeth as punched from sheet material have rounded corners 32a (Figure VII). The disk is then pressed by a punch having one or more cylindrical elements 37 positioned to overlap the corners of the rounded teeth. The ends of the elements 37 are beveled to form blunt cone points, the angle of the bevel being the same as the bevel desired on the tooth corners. When the punch elements 37 strike the teeth they deform the material causing it to flow outward to form the sharp edged, beveled tooth corners. After the pressing operation the disks may be hardened in the usual manner.

The punch elements 37 are made symmetrical so they may be rotated in their holder to distribute the wear over the entire end surface.

Inasmuch as the leading corner of a tooth does all of the cutting it is the only one that must be sharp and the other may be left dull without sacrifice of cutting efficiency.

This improved form of meat tenderizing cutter tooth provides efficient sinew cutting action because of its sharp corners and in addition is peculiarly adapted for knitting several pieces of meat together and is safe to handle because of the dull peripheral edges 31. This sharp corner feature also offers the advantage that the sharp cutting edges do not form the periphery of the cutting roll and therefore not liable to being damaged or dulled if the cutter roll is carelessly handled while it is removed from the machine for cleaning purposes.

Having described the invention, we claim:

A cutter suitable for use in the knife roll of a meat tenderizing machine, the cutter consisting of a thin metal disk having a plurality of teeth, each of the teeth having a flat peripheral portion and flat sides generally normal to the plane of the disk, each of the teeth having a beveled peripheral corner with the beveled portion adjacent the peripheral portion and the tooth side to leave a sharp point in the plane of one side of the disk at the intersection of one side of the tooth and the peripheral portion of the tooth.

ARTHUR E. LINDNER.
BRUCE E. ROBINSON.

REFERENCES CITED

The following references are of record in the file of this patent:

UNITED STATES PATENTS

| Number | Name | Date |
| --- | --- | --- |
| 199,308 | Nickerson | Jan. 15, 1878 |
| 675,958 | Liebert | June 11, 1901 |
| 1,130,283 | Hewett et al. | Mar. 2, 1915 |
| 1,690,803 | Vander Wee | Nov. 6, 1928 |
| 1,771,722 | Prentice | July 29, 1930 |
| 1,844,566 | Dienes | Feb. 9, 1932 |
| 1,918,770 | McLean | July 18, 1933 |
| 1,973,284 | Huse | Sept. 11, 1934 |
| 2,361,402 | Jamieson | Oct. 31, 1944 |
| 2,364,533 | Jackson | Dec. 5, 1944 |